US006996969B2

(12) United States Patent  
Dalton

(10) Patent No.: US 6,996,969 B2  
(45) Date of Patent: Feb. 14, 2006

(54) MULTI-MODE SHUTDOWN SYSTEM FOR A FUEL METERING UNIT

(75) Inventor: William H. Dalton, Amston, CT (US)

(73) Assignee: Goodrich Pump & Engine Control Systems, Inc., West Hartford, CT (US)

( * ) Notice: Subject to any disclaimer, the term of this patent is extended or adjusted under 35 U.S.C. 154(b) by 175 days.

(21) Appl. No.: 10/657,828

(22) Filed: Sep. 9, 2003

(65) Prior Publication Data

US 2005/0066648 A1    Mar. 31, 2005

(51) Int. Cl.  
*F02C 9/28*    (2006.01)

(52) U.S. Cl. .................. 60/39.281; 60/734

(58) Field of Classification Search ........... 60/39.091, 60/39.281, 734  
See application file for complete search history.

(56) References Cited

U.S. PATENT DOCUMENTS

| | | | |
|---|---|---|---|
| 2,322,568 A | 6/1943 | De Lancey | |
| 2,490,115 A | 12/1949 | Clarke | |
| 2,600,632 A | 6/1952 | French | |
| 2,606,503 A | 8/1952 | Shaw | |
| 2,639,585 A | 5/1953 | Camerota | |
| 2,755,740 A | 7/1956 | Alston | |
| 2,799,995 A | 7/1957 | Herman | |
| 2,907,279 A | 10/1959 | Carleton | |
| 2,975,717 A | 3/1961 | Rynders et. al. | |
| 3,153,984 A | 10/1964 | Fikse | |
| 3,391,702 A * | 7/1968 | Kast | 137/110 |
| 3,695,789 A | 10/1972 | Jansson | |
| 3,723,025 A | 3/1973 | Coakley | |
| 3,752,189 A | 8/1973 | Marr et al. | |
| 3,792,936 A | 2/1974 | Pettibone et al. | |
| 3,812,765 A | 5/1974 | Himmler | |
| 3,958,494 A | 5/1976 | Miller | |
| 4,198,195 A | 4/1980 | Sakamaki et al. | |
| 4,325,215 A | 4/1982 | Yamamoto | |

(Continued)

FOREIGN PATENT DOCUMENTS

EP    0 397 041 A    11/1990

(Continued)

OTHER PUBLICATIONS

Wong T. H. "Designing and Simulating the Engine Speed Governor for Helicopter Applications" ASME International Gas Turbine And Aeroengine Congress And Exposition, Jun. 5-8, 1995,—XP008021719—the whole document.

(Continued)

*Primary Examiner*—Louis J. Casaregola  
(74) *Attorney, Agent, or Firm*—Edwards & Angell, LLP; Scott D. Wofsy, Esq.; George N. Chaclas, Esq.

(57) ABSTRACT

A multi-mode shutdown system in combination with a fuel metering unit of an engine to prevent normal fuel delivery during engine malfunction such as the engine overspeeding. The multi-mode shutdown system includes a shutdown solenoid capable of closing a pressurizing valve to prevent fuel flow to the engine for creating a shutdown mode of operation with no fuel flow to the engine. The multi-mode shutdown system also includes a minimum flow solenoid in fluid communication a source of fuel at a minimum flow rate for creating a minimum flow mode of operation with fuel provided to the engine at the minimal flow rate. In the minimum flow mode, the shutdown solenoid and minimum flow solenoid establish a flow path for the fuel to the engine manifold at the minimal flow rate. During normal operation, the fuel metering unit regulates the fuel flow to the engine.

19 Claims, 1 Drawing Sheet

U.S. PATENT DOCUMENTS

| | | |
|---|---|---|
| 4,338,965 A | 7/1982 | Garnjost et al. |
| 4,342,545 A | 8/1982 | Schuster |
| 4,348,159 A | 9/1982 | Acheson |
| 4,443,159 A | 4/1984 | Dantlgraber |
| 4,496,290 A | 1/1985 | Nonnenmacher |
| 4,531,898 A | 7/1985 | Ideta |
| 4,540,347 A | 9/1985 | Child |
| 4,558,998 A | 12/1985 | Kiyoshige et al. |
| 4,567,813 A | 2/1986 | Garnjost |
| 4,649,700 A * | 3/1987 | Gardiner et al. .......... 60/39.281 |
| 4,760,662 A * | 8/1988 | Dyer et al. .............. 60/39.281 |
| 4,768,540 A | 9/1988 | Mochizuki et al. |
| 4,770,612 A | 9/1988 | Teubler |
| 4,971,535 A | 11/1990 | Okada et al. |
| 5,035,254 A | 7/1991 | Blatter et al. |
| 5,141,418 A | 8/1992 | Ohtaki et al. |
| 5,168,704 A | 12/1992 | Kast et al. |
| 5,174,339 A | 12/1992 | Pickard |
| 5,178,525 A | 1/1993 | Murota |
| 5,209,058 A | 5/1993 | Sparks et al. |
| 5,235,806 A | 8/1993 | Pickard |
| 5,266,018 A | 11/1993 | Niemiec |
| 5,357,935 A | 10/1994 | Oxley et al. |
| 5,413,466 A | 5/1995 | Bennett et al. |
| 5,435,718 A | 7/1995 | Briggs |
| 5,448,882 A | 9/1995 | Dyer et al. |
| 5,484,271 A | 1/1996 | Stich |
| 5,505,592 A | 4/1996 | Kumagai et al. |
| 5,518,380 A | 5/1996 | Fujii et al. |
| 5,538,400 A | 7/1996 | Konishi et al. |
| 5,545,018 A | 8/1996 | Sundberg |
| 5,562,432 A | 10/1996 | Semba et al. |
| 5,613,535 A | 3/1997 | Loen |
| 5,690,479 A | 11/1997 | Lehmann et al. |
| 5,715,674 A | 2/1998 | Reuter et al. |
| 5,716,201 A | 2/1998 | Peck et al. |
| 5,733,109 A | 3/1998 | Sundberg |
| 5,738,500 A | 4/1998 | Sundberg et al. |
| 5,800,131 A | 9/1998 | Lehmann et al. |
| 5,806,300 A | 9/1998 | Veilleux, Jr. et al. |
| 5,833,438 A | 11/1998 | Sundberg |
| 5,895,209 A | 4/1999 | Miyazawa |
| 5,896,737 A | 4/1999 | Dyer |
| 5,951,240 A | 9/1999 | Mirsky et al. |
| 6,102,001 A | 8/2000 | McLevige |
| 6,508,225 B1 | 1/2003 | Hiki |
| 6,578,777 B2 | 6/2003 | Bui |

FOREIGN PATENT DOCUMENTS

EP    1 048 842 A2    2/2000

OTHER PUBLICATIONS

Morrison T. Howlett J.J., Zagranski R. D. "Adaptive Fuel Control Feasibility Investigation for Helicopter Applications" 27th ASME International Gas Turbine Exhibit—p. 3, col. 1—4, col. 2; figure 3.

* cited by examiner

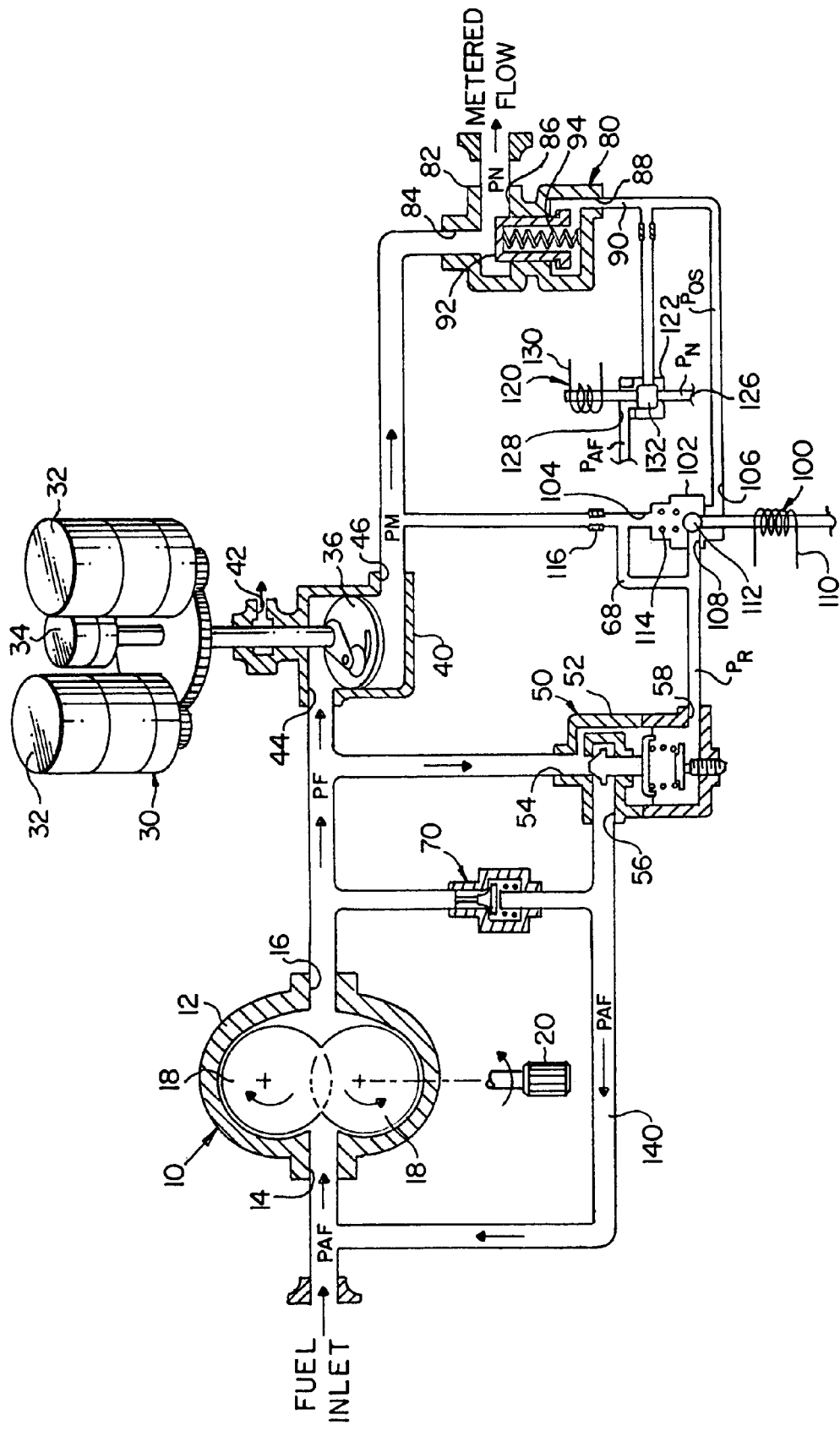

MULTI-MODE SHUTDOWN SYSTEM FOR A FUEL METERING UNIT

BACKGROUND OF THE INVENTION

1. Field of the Invention

The subject invention is directed generally to a shutdown system for controlling the fluid flow from a fuel metering unit to an engine, and more particularly, to a shutdown system associated with an aircraft engine that can quickly provide either a minimum flow of fuel to the engine or a complete shutdown of fuel delivery in response to an overspeed condition.

2. Background of the Related Art

Modern aircraft engines function under operating conditions that often include harsh extremes of weather and performance demands. Under such circumstances, engine malfunction can occur. For example, an engine may increase in speed in an uncontrolled manner, i.e. an overspeed condition. If unremedied, an overspeed condition can cause an engine to fail resulting in loss of control and catastrophe for the aircraft. As a result, designers have incorporated shutdown systems in the fuel pump control system to stop fuel delivery to the engine and, in turn, shut down the engine to maintain safety and control. Typically, a shutdown system employs a fast acting solenoid or other well-known means. For examples, see U.S. Pat. Nos. 6,508,225; 5,435,718; and 5,357,935, which are incorporated herein by reference in their entirety.

In certain conditions a complete shutdown of the engine may not be the best possible solution. Stopping the undesirable behavior of the engine while maintaining the engine in an operational state would allow the pilot an opportunity to have improved control of the aircraft. If the improved control is not achieved, the complete shutdown of the malfunctioning engine could then be implemented. In view of the above, it would be desirable to provide a shutdown system for a fuel metering unit which has two available modes of shutdown, one mode would be a minimum fuel flow condition to maintain the engine in an operational state and another mode would be a zero fuel flow condition for a total engine shutdown.

SUMMARY OF THE INVENTION

In accordance with a preferred embodiment of the subject invention, the advantages of the present disclosure are accomplished by employing a multi-mode shutdown system for use with a fuel metering unit of an engine. The system includes a shutoff valve operative to selectively block an output of the fuel metering unit and a shutdown solenoid in fluid communication with the shutoff valve for selectively closing the shutoff valve. An orifice creates a minimum flow from the output of the fuel metering unit and a minimum flow solenoid is in fluid communication with the minimum flow for selectively blocking a minimum flow path for the minimum flow to the engine. During a normal operation mode, the shutdown solenoid opens the shutoff valve and the minimum flow solenoid blocks the minimum flow path to the engine such that the engine receives the output of the fuel metering unit. During a shutdown mode, the minimum flow solenoid blocks the minimum flow path to the engine and the shutdown solenoid closes the shutoff valve such that the shutoff valve blocks the output of the fuel metering unit to stop fuel flow to the engine. During a minimum flow mode, the shutdown solenoid closes the shutoff valve, and the minimum flow solenoid opens such that the minimum flow passes to the engine via the minimum flow path.

It is an object of the present disclosure to provide a system that can rapidly shutdown fuel flow to an engine or rapidly create a minimum fuel flow condition to prevent catastrophic failure from engine malfunction.

It is an object of the present disclosure to provide a multi-mode shutdown system that can be retrofit onto existing fuel metering units.

It is another object of the present disclosure to provide a regulated substantially minimum flow to the engine during minimum flow operation.

BRIEF DESCRIPTION OF THE DRAWINGS

So that those having ordinary skill in the art to which the subject invention appertains will more readily understand how to make and use the same, reference may be had to the Sole FIGURE wherein:

The Sole FIGURE is a schematic representation of a fuel metering unit integral with a multi-mode shutdown system in accordance with a preferred embodiment of the subject invention.

DETAILED DESCRIPTION OF PREFERRED EMBODIMENTS

Referring now to the Sole FIGURE, there is illustrated a schematic representation of a multi-mode shutdown system integral with a fuel metering unit of an aircraft engine in accordance with the subject invention. For clarity throughout the following description, arrows are shown in the Sole FIGURE to indicate the direction in which the fuel flows and an annotated letter "P" is shown to indicate a pressure at certain locations. All relative descriptions herein such as left, right, up, and down are with reference to the Sole FIGURE and not meant in a limiting sense. Additionally, for clarity common items such as filters have not been included in the Sole FIGURE.

The multi-mode shutdown system affects operation of the fuel metering unit when the engine receiving fuel malfunctions. As a result of the malfunction, modified operation or shutdown is utilized to maintain safe operation of the aircraft. The multi-mode shutdown system includes a total shutdown mode to prevent fuel flow to the engine to shutdown the engine. The multi-mode shutdown system also includes a minimum flow mode of operation with fuel provided at a minimal flow rate to prevent overspeeding, yet maintain the engine in an operational state. In the minimum flow mode, the multi-mode shutdown systems establishes a flow path for fuel to the engine manifold at the minimum flow rate. During normal operation, the fuel metering unit regulates the fuel flow to the engine in a manner known to those of ordinary skill in the pertinent art.

The fuel metering unit has a positive displacement pump assembly 10 that receives fuel flow at an inlet pressure $P_{AF}$, and delivers fuel flow at an output pressure $P_F$. The pump 10 has a housing 12 that defines an inlet 14 and an outlet 16. Two gears 18 within the housing 12 rotate to generate increased fuel flow. At the elevated flow rate, any resistance in the shutdown system or fuel metering unit results in an elevated pressure thereafter. The pump 10 has a spline drive 20 for transmitting torque.

A main metering valve assembly 30 is disposed between the pump 10 and engine (not shown) for providing fuel to the engine at a selected rate and pressure $P_N$. In a preferred embodiment, the main metering valve 30 is a metering and shutoff valve that is controlled by two stepper motor assemblies 32 with dual rotational variable displacement transducers 34 (hereinafter "RVDT"). The RVDTs 34 monitor the position of the stepper motor assemblies 32 and provide a signal to an electronic engine controller (not shown). The housing 40 of main metering valve 30 forms an inlet 44 for receiving fuel at pressure $P_F$ and an outlet 46 where fuel exits at pressure $P_M$. The two motor assemblies 32 control the position of a disc 36 within a housing 40 to selectively vary the fuel passing therethrough or stop flow altogether.

Typically, the main metering valve 30 would be utilized to stop fuel flow during a normal shutdown. A bleed outlet 42 in the housing 40 provides a source of fuel for bleed actuators and the like. Main metering valve 30 receives fuel via inlet 44 at pressure $P_F$ and the fuel exits via outlet 46 at pressure $P_M$. Although the main metering valve 30 can shutdown flow through the fuel metering unit, it is envisioned that the response time is inadequate for remedying an engine overspeed condition prior to catastrophic failure. Suitable main metering valves are well known in the art and a variety of metering valves may be utilized as long as the selected valve performs the function of selectively varying the amount of fuel passing therethrough.

A head regulator valve assembly 50 is in fluid communication with the main metering valve 30 and the pump 10 for maintaining a pressure differential across the main metering valve 30. The pressure differential is equal to ($P_F$–$P_M$). A housing 52 of the head regulator 50 defines a first inlet 54 for receiving fuel at pressure $P_F$ from the pump 10, and an outlet 56 connected to the low reference pressure $P_{AF}$. A second inlet 58 formed in the head regulator housing 52 is operatively connected to the output 46 of the main metering valve 30 via a bypass line 68. A relief valve assembly 70 is connected between the first inlet 56 of the regulator housing 52 and the outlet 16 of the pump housing 12 for preventing pressure $P_F$ from exceeding desired levels. The head regulator 50 and relief valve 70 are well known in the art and, therefore, not further described herein for simplicity.

After the fuel passes through the main metering valve 30 and before the fuel passes to the engine, the fuel passes through a pressurizing/shutoff valve assembly 80. A housing 82 of the shutoff valve 80 defines an inlet 84 for receiving fuel at pressure $P_M$ and an outlet 86 connected to the engine. The shutoff valve 80 provides resistance to flow such that the pressure $P_F$ is normally greater than $P_{AF}$ thus allowing flow through head regulator 50. A second inlet 88 of the housing 82 receives a reference pressure line 90 for controlling the pressure $P_{OS}$ and, thereby, a valve spool 92 within the housing 82. A spring 94 biases the valve spool 92 upwards to a normally closed position.

A shutdown solenoid assembly 100 is in fluid communication with the output 46 of the metering valve 30 at pressure $P_R$ via an inlet 104 formed in the solenoid housing 102. The solenoid housing 102 also forms an outlet 106 connected to the shutoff valve 80 via the reference pressure line 90, as well as a second outlet 108 connected to the second inlet 58 of the regulator housing 52. The shutdown solenoid 100 can actuate to vary the pressure in the reference pressure line 90 as well as the pressure present at the second inlet 58 of the regulator housing 52. In a preferred embodiment, the shutdown solenoid 100 has an electrical actuating mechanism 110 that controls the setting of the solenoid 100 by moving a position of a plunger 112 within the solenoid housing 102. A spring 114 is provided within the solenoid housing 102 to provide a biasing force against the plunger 112. A minimum flow orifice 116 limits the fuel flow between the main metering valve output 46 and an inlet 104 of the shutoff solenoid 100. The minimum flow orifice 116 changes the pressure of the fuel flowing therethrough.

A minimum flow solenoid 120 is in fluid communication with the shutoff valve 80 through the reference pressure line 90 via an opening 124 formed in the solenoid housing 122. The solenoid housing 122 also forms an outlet 126 connected to the engine as well as an inlet 128 connected to the low reference pressure $P_{AF}$. Accordingly, the minimum flow solenoid 120 can creating a minimum flow path between the main metering valve output 46 and the engine via shutdown solenoid 100. The minimum flow solenoid 120 can also connect the reference pressure line 90 to the low reference pressure $P_{AF}$. In a preferred embodiment, the minimum flow solenoid 120 has an electrical actuating mechanism 130 that sets the solenoid 120 by moving a position of a plunger 132 within the solenoid housing 122.

During normal operation, metered fuel is provided to the engine. Fuel enters the positive displacement pump 10 at low reference pressure $P_{AF}$ and exits at pressure $P_F$ with an elevated flow rate. The main metering valve 30 receives the fuel at pressure $P_F$ and the pressure differential across the main metering valve 30 results in the fuel exiting the main metering valve 30 at pressure $P_M$. The plunger 112 in the shutdown solenoid 100 is set downward by the actuating mechanism 110 to block a flow path between the head regulator 50 and the shutoff valve 80. By the plunger 112 being downward, there is not a flow path from the head regulator 50 to the reference pressure line 90. Thus, the head regulator 50 maintains the desired pressure differential across the main metering valve 30. The plunger 132 in the minimum flow solenoid 120 is set downward by the actuating mechanism 130 to create a flow path from the low reference pressure $P_{AF}$ to the reference pressure line 90, i.e. the inlet 88 of the shutoff valve 80. By the plunger 132 being downward, the fuel at pressure $P_{AF}$ allows the valve spool 92 to move downward such that the metered fuel output is provided to the engine.

An engine malfunction may occur and a minimum flow mode may be desired in an effort to prevent engine overspeed and the like, while maintaining the engine in an operational condition. To accomplish this minimum flow mode, the plunger 112 of the shutdown solenoid 100 is set upward to create a flow path between the reference pressure line 90 and the fuel flowing through the minimum flow orifice 116. The plunger 132 of the minimum flow solenoid 120 is set upward to create a minimum flow path between the engine and the reference pressure line 90. The fuel at pressure $P_M$ flows through the minimum flow orifice 116 to become the minimum flow. Thereafter, the minimum flow passes through the shutdown solenoid 100 via inlet 104 and outlet 106. At pressure $P_{OS}$ in line 90, the minimum flow passes into inlet 124 of the minimum flow solenoid 120. The plunger 132 of the minimum flow solenoid 120 routes the minimum flow through the outlet 126 of the minimum flow solenoid 120 to the engine.

The minimum flow orifice 116 is sized and configured to provide the desired minimum flow and the head regulator 50 maintains a fixed pressure differential across the minimum flow orifice 116. Hence, the minimum flow is metered and regulated. The elevated pressure $P_{OS}$ in line 90 causes spool 92 to move upward in the housing 82 and close off the normal operation flow path for fuel to the engine. Preferably, the metering valve 30 provides a relatively large opening compared to the minimum flow orifice 116 to insure accurate operation. During minimum flow mode, the fuel flow to the engine is quickly reduced by the fast actuation of the solenoids 100, 120 and shutoff valve 80. Thus, the engine may remain operational and be brought under control.

It is envisioned that at altitude, the minimum flow mode may not result in containment of the emergency and total shutdown may be necessary. To accomplish a shutdown mode, the plunger 112 of the shutdown solenoid 100 is actuated upward and the plunger 132 of the minimum flow solenoid 120 is actuated downward. A flow path from the metered output of the main metering valve 30 to the low reference pressure $P_{AF}$ at outlet 128 of the minimum flow solenoid 120 is established. The pressure $P_{OS}$ in reference pressure line 90 is elevated as a result of the pressure increase across the minimum flow orifice 116 such that spool 92 moves upward in housing 82 to close fuel flow through the shutoff valve 80. Hence, the fuel flow path to the engine is closed and the malfunctioning engine will cease to operate.

The minimum flow orifice 116 creates a sufficient interim pressure $P_{OS}$ to always close the shutoff valve 80 when the plunger 112 of the shutdown solenoid 100 is actuated upward. During shutdown mode, the head regulator 50 continues to regulate the pressure differential across the main metering valve 30 and minimum flow orifice 116. As necessary, the head regulator 50 will open to allow pressure to pass into line 140 having the low reference pressure $P_{AF}$ therein to prevent the relief valve 70 from being overloaded.

In summary, the shutdown solenoid 100 and minimum flow solenoid 120 are used to remedy a malfunctioning engine by creating either a minimum fuel flow shutdown mode or a total engine shutdown mode. The shutdown solenoid 100 actuates to close the shutoff valve 80 and the minimum flow solenoid 120 determines whether or not an alternative minimum flow path to the engine is created. It would be appreciated by those of ordinary skill in the art that other types of pumps, valves, regulators and solenoids, similarly and differently arranged, would perform acceptably well within alternative embodiments of the subject invention and are, therefore, considered mere design choices. It will be appreciated by those of ordinary skill in the pertinent art that a control system would interact with the multi-mode shutdown system and the aircraft to implement the switching signals and operation as described above.

While the subject invention has been described with respect to preferred embodiments, those skilled in the art will readily appreciate that various changes and/or modifications can be made to the invention without departing from the spirit or scope of the invention as defined by the appended claims.

What is claimed is:

1. A multi-mode shutdown system for use with a fuel metering unit of an engine, comprising:
   (a) a shutoff valve operative to selectively block an output flow from the fuel metering unit;
   (b) a shutdown solenoid in fluid communication with the shutoff valve for selectively closing the shutoff valve;
   (c) an orifice for creating a minimum flow from the output flow from the fuel metering unit; and
   (d) a minimum flow solenoid in fluid communication with the minimum flow for selectively blocking a minimum flow path for the minimum flow to the engine, wherein:
      (i) during a normal operation mode, the shutdown solenoid opens the shutoff valve and the minimum flow solenoid blocks the minimum flow path to the engine such that the engine receives the output of the fuel metering unit; (ii) during a shutdown mode, the minimum flow solenoid blocks the minimum flow path to the engine and the shutdown solenoid closes the shutoff valve such that the shutoff valve blocks the output of the fuel metering unit to stop fuel flow to the engine; and (iii) during a minimum flow mode, the shutdown solenoid closes the shutoff valve, and the minimum flow solenoid opens such that the minimum flow passes to the engine via the minimum flow path.

2. A fuel metering unit as recited in claim 1, wherein the minimum flow is regulated.

3. A fuel metering unit as recited in claim 1, wherein the minimum flow is at an elevated pressure.

4. A fuel metering unit as recited in claim 1, wherein the minimum flow path passes through the shutdown solenoid.

5. A fuel metering unit as recited in claim 1, wherein the shutdown solenoid connects to the output of the fuel metering unit such that the output closes the shutoff valve.

6. A fuel metering unit as recited in claim 1, wherein the minimum flow solenoid connects the shutoff valve to a low reference pressure during the shutdown mode and the normal operation mode.

7. A fuel metering unit as recited in claim 1, further comprising a head regulator in fluid communication with the minimum flow orifice for maintaining a pressure differential across the orifice.

8. A fuel metering unit as recited in claim 1, wherein the minimum flow solenoid creates a shutdown flow path for the output of the fuel metering unit to return to a low reference pressure during the shutdown mode.

9. A multi-mode shutdown system for a fuel metering unit comprising:
   a valve connected between the fuel metering unit and an engine wherein during normal operation, the valve provides a flow path from the fuel metering unit to the engine;
   first means operatively connected to the valve for selectively stopping fuel flow to the engine by closing the valve; and
   a solenoid having an inlet connected to the minimum flow and an outlet operatively connected to the engine for selectively providing a minimum flow of fuel to the engine.

10. A multi-mode shutdown system as recited in claim 9, wherein the first means is a solenoid having an inlet connected to a pressurized fuel line and an outlet connected to the valve.

11. A multi-mode shutdown system as recited in claim 9, further comprising third means for creating the substantially minimum flow.

12. A multi-mode shutdown system as recited in claim 11, wherein the third means is an orifice for limiting flow through a line connected between an output of the fuel metering unit and the second means.

13. A multi-mode shutdown system as recited in claim 11, wherein flow through the third means is regulated.

14. A multi-mode shutdown system for use with a fuel metering unit of an engine, wherein the fuel metering unit includes: a positive displacement pump for generating increased pressure; a main metering valve in fluid communication with the positive displacement pump for varying an output of the fuel metering unit; a head regulator operative to maintain a pressure differential across the main metering valve; a shutoff valve operative to selectively close the output; and a shutdown solenoid in fluid communication with the valve for selectively closing the valve, the multi-mode shutdown system comprising:
   (a) a minimum flow solenoid in fluid communication with a minimum fuel flow for selectively providing the minimum fuel flow to the engine, wherein:

(i) during normal operation, fuel enters the positive displacement pump and the pressure is increased, the main metering valve receives the fuel and a pressure differential across the main metering valve results in the fuel exiting the main metering valve at a lower pressure, the shutdown solenoid opens the shutoff valve, the fuel enters the shutoff valve and exits to the engine, the head regulator maintains the pressure differential across the main metering valve, and the minimum flow solenoid blocks the minimum fuel flow from the engine;

(ii) during a shutdown mode, the minimum flow solenoid blocks the minimum fuel flow to the engine and the shutdown solenoid closes the shutoff valve to stop fuel flow to the engine; and (iii) during a minimum flow mode, the shutdown solenoid closes the shutoff valve; and the minimum flow solenoid provides the minimum fuel flow to the engine.

15. A multi-mode shutdown system as recited in claim 14, wherein during normal operation, the minimum flow solenoid connects the shutoff valve to a low reference pressure such that the shutoff valve is open.

16. A multi-mode shutdown system as recited in claim 14, further comprising a minimum flow orifice in fluid communication with the output of the fuel metering unit for creating the minimum fuel flow.

17. A multi-mode shutdown system as recited in claim 16, wherein the minimum fuel flow is regulated by the head regulator.

18. A multi-mode shutdown system as recited in claim 16, wherein the minimum fuel flow passes through the shutdown solenoid.

19. A multi-mode shutdown system for a fuel metering unit comprising: a valve connected between the fuel metering unit and an engine wherein during normal operation, the valve provides a flow path from the fuel metering unit to the engine; a solenoid having an inlet connected to a pressurized fuel line and an outlet operatively connected to the valve for selectively stopping fuel flow to the engine by closing the valve; and second means operatively connected to the engine for selectively providing a minimum flow of fuel to the engine.

* * * * *